(12) United States Patent
Birnbaum

(10) Patent No.: US 12,720,177 B2
(45) Date of Patent: Aug. 25, 2026

(54) CAMERA ARRANGEMENTS WITH MOUNTED IMAGE SENSORS

(71) Applicant: Apple Inc., Cupertino, CA (US)

(72) Inventor: Zachary W. Birnbaum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 18/205,380

(22) Filed: Jun. 2, 2023

(65) Prior Publication Data

US 2024/0406527 A1 Dec. 5, 2024

(51) Int. Cl.
*H04N 23/54* (2023.01)
*H04N 23/55* (2023.01)
*H04N 23/68* (2023.01)
*H04N 23/90* (2023.01)

(52) U.S. Cl.
CPC ............. *H04N 23/54* (2023.01); *H04N 23/55* (2023.01); *H04N 23/90* (2023.01); *H04N 23/687* (2023.01)

(58) Field of Classification Search
CPC ...................................................... H04N 23/45
See application file for complete search history.

(56) References Cited

U.S. PATENT DOCUMENTS 5,761,543 A 6/1998 Yamada
6,477,326 B1 11/2002 Partynski
6,593,558 B1 7/2003 Edgar
6,788,461 B2 9/2004 Kurtz et al.
7,490,779 B2 2/2009 Shinozaki
7,934,836 B2 5/2011 Ito
8,259,203 B2 9/2012 Baldwin
8,355,042 B2 1/2013 Lablans
8,553,106 B2 10/2013 Scarff
8,737,830 B2 5/2014 Cheng et al.
8,988,564 B2 3/2015 Webster et al.
9,465,221 B2 10/2016 Webster et al.
9,632,279 B2 4/2017 Chen
9,686,531 B2 6/2017 Ko et al.
9,968,285 B2 5/2018 Valsan et al.
10,042,139 B2 * 8/2018 Ho ......................... H04N 23/57
(Continued)

OTHER PUBLICATIONS

U.S. Appl. No. 17/948,054, filed Sep. 19, 2022, Rayankula et al.
U.S. Appl. No. 17/950,927, filed Sep. 22, 2022, Williams et al.
U.S. Appl. No. 18/101,950, filed Jan. 26, 2023, Alaimo et al.

*Primary Examiner* — Lin Ye
(74) *Attorney, Agent, or Firm* — Brownstein Hyatt Faber Schreck, LLP

(57) ABSTRACT

Embodiments of the disclosure are related to a camera assembly having a base plate, a first image sensor module, a first lens module, a first actuator, a second image sensor module, and a second lens module. The base plate includes a first portion having an upper surface, and a second portion having an upper surface and a lower surface. The upper surface of the second portion is elevated relative to the upper surface of the first portion. The first image sensor module is mounted on the upper surface of the first portion, while the second image sensor module is mounted to the lower surface of the second portion. The first lens module is disposed above the base plate for transmitting light to the first image sensor module, while the second lens module is disposed above the base plate for transmitting light to the second image sensor module.

17 Claims, 9 Drawing Sheets

(56) References Cited

U.S. PATENT DOCUMENTS 10,257,433 B2 4/2019 Eromäki
10,264,188 B2 * 4/2019 Miller ...................... G02B 7/10
10,298,913 B2 5/2019 Shpunt et al.
10,475,171 B2 11/2019 Mrdjen et al.
10,761,292 B2 * 9/2020 O ............................ G02B 7/09
10,779,734 B2 9/2020 Fengler et al.
10,820,790 B2 11/2020 Nagae
11,102,384 B2 * 8/2021 Wang ..................... H05K 3/301
11,328,150 B2 5/2022 Fan
11,457,133 B2 9/2022 Attar
11,563,883 B2 1/2023 Noh et al.
11,601,576 B2 * 3/2023 Wang ..................... H04N 23/54
11,736,784 B2 8/2023 Kiniwa et al.
11,754,684 B2 9/2023 David et al.
12,101,542 B2 * 9/2024 Han ....................... H04N 23/55
2005/0051728 A1 3/2005 Miyauchi
2006/0022290 A1 2/2006 Chen et al.
2009/0303317 A1 12/2009 Tesar
2010/0033813 A1 2/2010 Rogoff
2010/0079587 A1 4/2010 Yoshida
2011/0134303 A1 6/2011 Jung et al.
2011/0190639 A1 8/2011 Peltie et al.
2013/0141541 A1 6/2013 Jung et al.
2013/0242057 A1 9/2013 Hong et al.
2014/0066781 A1 3/2014 Park et al.
2015/0316744 A1 * 11/2015 Chen ........................ G02B 7/08
359/824
2016/0241763 A1 * 8/2016 Jung ...................... H04N 23/54
2017/0020377 A1 1/2017 Takeuchi et al.
2017/0146771 A1 * 5/2017 Ho ......................... H04N 23/54
2019/0369678 A1 * 12/2019 Park .................... H04M 1/0264
2020/0089020 A1 * 3/2020 Lee ........................ G03B 11/04
2020/0292778 A1 * 9/2020 Li .......................... G02B 7/021
2020/0355985 A1 * 11/2020 Jung ...................... H04N 23/60
2021/0052149 A1 2/2021 Fukumoto et al.
2021/0168269 A1 6/2021 Wheatley et al.
2021/0302589 A1 9/2021 Takeuchi
2022/0070347 A1 * 3/2022 Han ....................... G03B 13/36
2024/0106305 A1 3/2024 Williams et al.
2024/0107136 A1 3/2024 Rayankula et al.
2024/0107148 A1 3/2024 Alaimo et al.

* cited by examiner

CAMERA ARRANGEMENTS WITH MOUNTED IMAGE SENSORS

FIELD

The described embodiments relate generally to camera arrangements that may be used in electronic devices. More particularly, the present embodiments relate to base plates designed and arranged for mounting image sensors and actuators of multiple cameras in a camera assembly used in electronic devices.

BACKGROUND

The advent of small, mobile multipurpose devices such as smartphones and tablet devices has resulted in a need for accurate, small form factor cameras for integration into such devices. Some small form factor cameras may incorporate optical image stabilization (OIS) mechanisms that may sense and react to external excitation/disturbance forces by adjusting a relative location between one or more lens elements and an image sensor in one or more directions in an attempt to compensate for unwanted motion of the camera. Some small form factor cameras may incorporate an autofocus (AF) mechanism whereby an object focal distance can be adjusted to focus an object in front of the camera at an image plane to be captured by the image sensor of the camera. In some such autofocus mechanisms, the relative position between the image sensor and one or more lens elements along the optical axis of the camera may be changed to refocus the camera. Because space is increasingly at a premium in electronic devices, it is desirable to provide compact camera assemblies for use in these devices.

SUMMARY

Described herein are camera assemblies that include a base plate to which multiple image sensor modules are mounted. Certain embodiments of this disclosure are directed to a camera assembly having a base plate, a first image sensor module, a first actuator, and a second image sensor module. The base plate includes a first portion having an upper surface, and a second portion having an upper surface and a lower surface. The upper surface and the lower surface of the second portion define an aperture extending therethrough, wherein the upper surface of the second portion is elevated relative to the upper surface of the first portion. The first image sensor module is mounted on the upper surface of the first portion, and includes a first image sensor. The first actuator is configured to move the first image sensor in a lateral direction. The second image sensor module is mounted to the lower surface of the second portion, and includes a second image sensor positioned to receive light through the aperture.

Other embodiments of this disclosure are directed to a camera assembly having a base plate, a first image sensor module, a second image sensor module, a first lens module, and a second lens module. The base plate includes a first portion having an upper surface, and a second portion having an upper surface and a lower surface. The upper surface and the lower surface of the second portion define an aperture extending therethrough, wherein the upper surface of the second portion is elevated relative to the upper surface of the first portion. The first image sensor module is mounted on the upper surface of the first portion, and includes a first image sensor. The second image sensor module is mounted to the lower surface of the second portion, and includes a second image sensor positioned to receive light through the aperture. The first lens module is disposed above the base plate for transmitting light to the first image sensor, and has a first optical axis. The second lens module is disposed above the base plate for transmitting light to the second image sensor, and has a second optical axis.

Still other embodiments are directed to a camera assembly having a base plate, a first lens module, a first image sensor module, a first actuator, a second lens module, a second image sensor module, and a second actuator. The base plate includes an upper surface and a lower surface. The base plate defines a first aperture and a second aperture extending through the upper surface and the lower surface. The first lens module is disposed above the base plate and has a first optical axis. The first image sensor module is mounted to the lower surface of the base plate, and includes a first image sensor aligned with the first lens module along the first optical axis, wherein the first image sensor is positioned to receive light from the first lens module through the first aperture. The first actuator is disposed above the base plate and configured to move the first image sensor module vertically along the first optical axis to focus light from the first lens on the first image sensor. The second lens module is disposed above the base plate and has a second optical axis. The second image sensor module is mounted to the lower surface of the base plate, and include a second image sensor aligned with the second lens module along the second optical axis. The second image sensor is positioned to receive light from the second lens module through the second aperture. The second actuator is disposed above the base plate and configured to move the second image sensor module vertically along the second optical axis to focus light from the second lens on the second image sensor. The first actuator in the camera assembly includes a first magnet that is shared by the second actuator in moving the first lens module and the second lens module.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
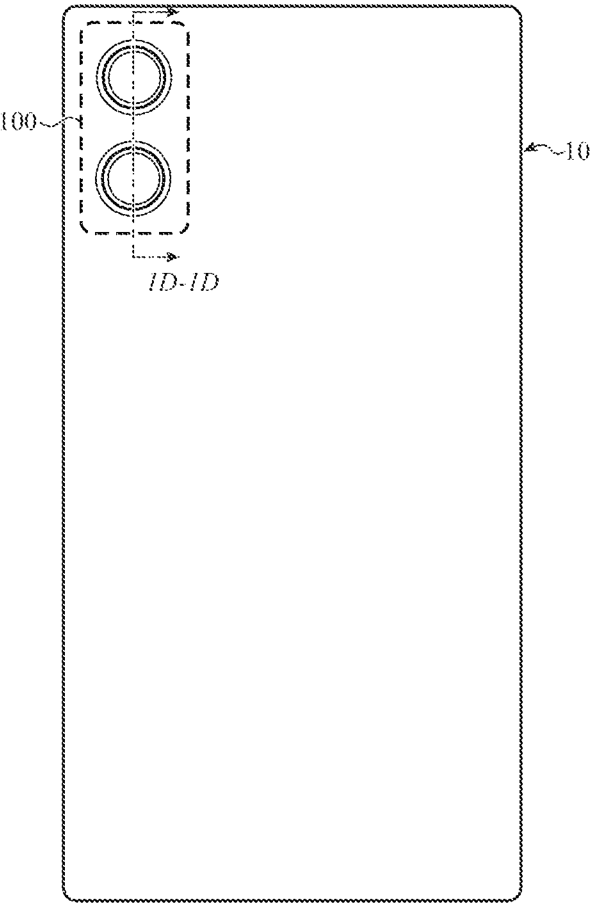
FIG. 1A shows a rear view of an example mobile electronic device having a first example camera assembly disposed therein, according to certain aspects of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

For purposes of the present detailed description, the word "including" means "including without limitation." Additionally, directional terminology, such as "top", "bottom". "upper", "lower", "front", "back", "over". "under", "above", "below", "left", "right", etc. is used with reference to the orientation of some of the components in some of the figures described below. Moreover, terms that indicate a particular orientation (e.g. "vertical" or "horizontal") are intended to additionally include "within 3-5% of" that orientation. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. These words are intended to relate to the equivalent direction as depicted in a reference illustration; as understood contextually from the object(s) or element(s) being referenced, such as from a commonly used position for the object(s) or element(s); or as otherwise described herein.

Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Embodiments of the disclosure are directed to camera assemblies for use in electronic devices (e.g., smartphones, tablet computers, etc.) and more particularly, to base plates designed for mounting image sensors and optionally components of actuators of multiple cameras in such a camera assembly. Embodiments of the base plates described herein enable construction of a single unified camera assembly that incorporates multiple individual camera assemblies. These camera assemblies may have independently-controllable autofocus capabilities, and may share at least one magnet that generates magnetic field for moving respective lens modules in each of the cameras. Such designs provide improved alignment and size optimization for fitting multiple camera components within the same camera assembly, as further described with respect to the embodiments below. In some instances, at least one of the cameras may further have optical image stabilization capabilities.

Figure 1B:
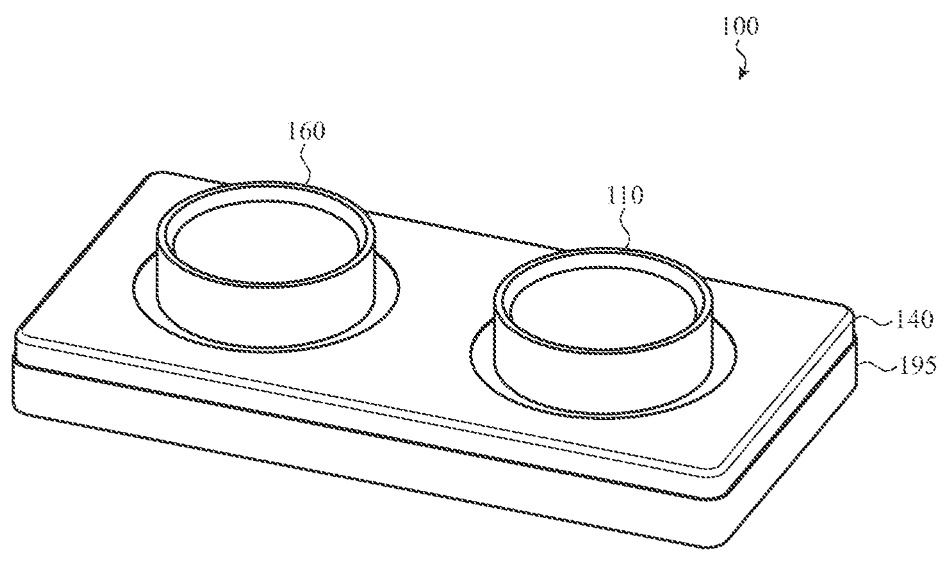
FIG. 1B shows a top perspective view of the first example camera assembly of FIG. 1A, according to certain aspects of the present disclosure.
Figure 1C:
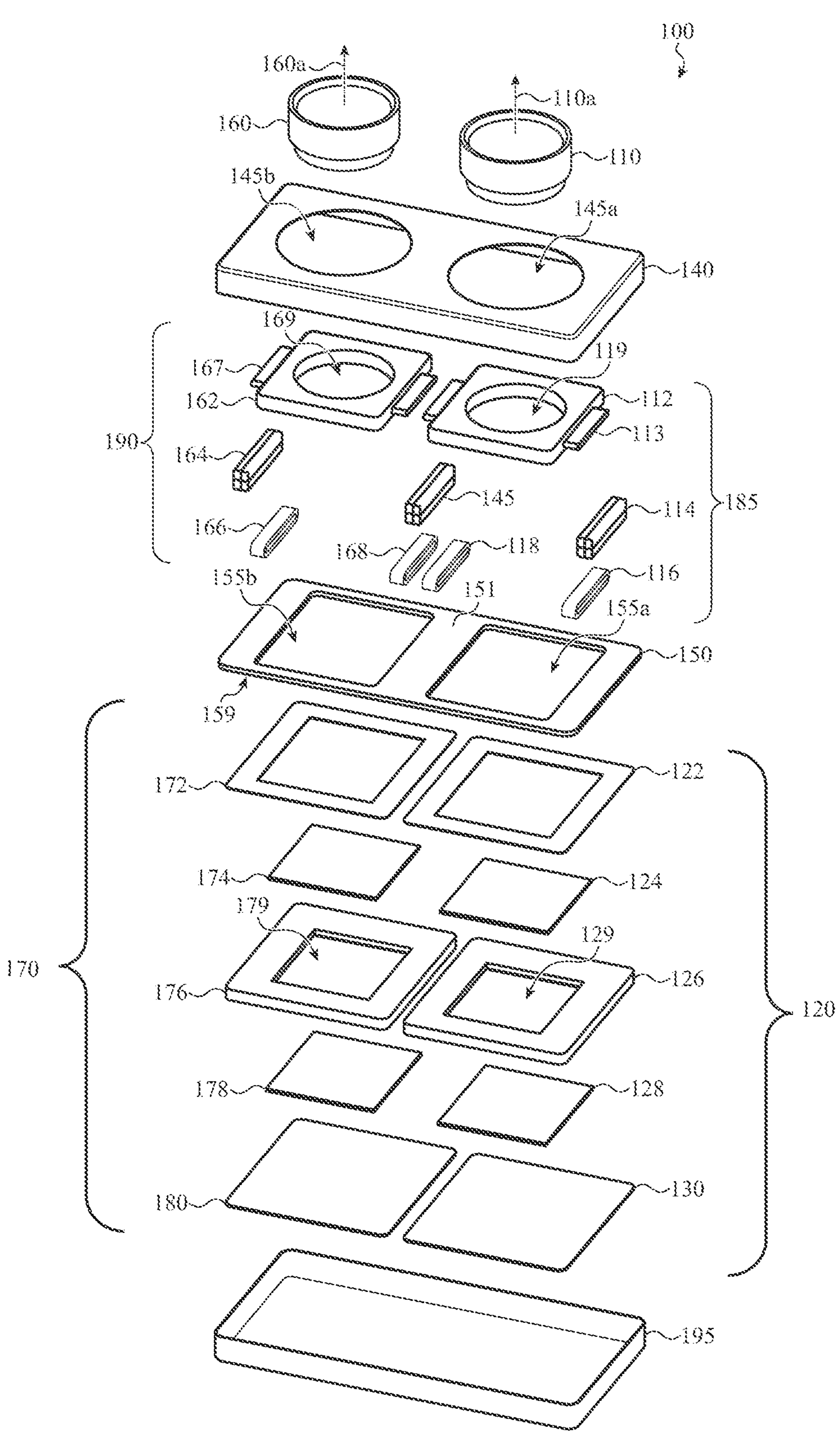
FIG. 1C shows an exploded perspective view of the first example camera assembly of FIG. 1A, according to certain aspects of the present disclosure.
Figure 1D:
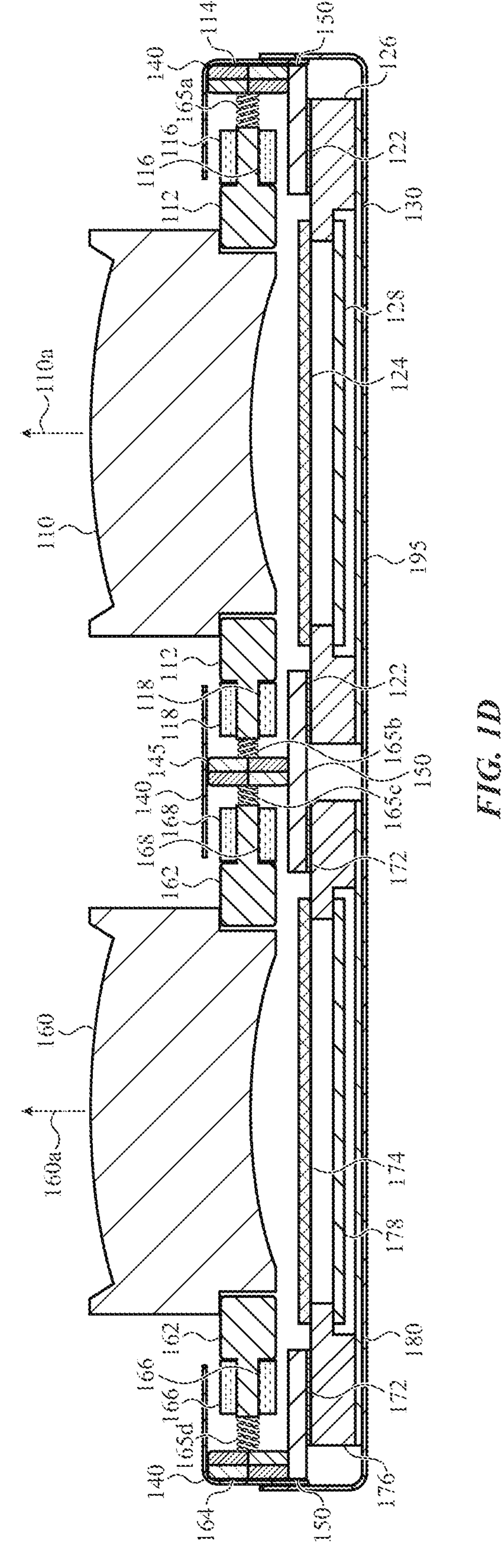
FIG. 1D shows a cross-sectional side view of the first example camera assembly of FIG. 1A, taken along line 1D-1D, according to certain aspects of the present disclosure.

FIG. 1A shows a rear view of an example electronic device 10 having a first example camera assembly 100 disposed therein, while FIGS. 1B-1D show a top perspective view, an exploded perspective view, and a cross-sectional side view of the first camera assembly 100. While the electronic device 10 depicted in FIGS. 1A-1D (as well as the electronic device 20 depicted in FIGS. 2A-2D) as a mobile phone (e.g., a smartphone), the first camera assembly 100 may alternatively be incorporated into any suitable electronic device including, for example a tablet computer, portable computer, desktop computer, monitor, portable music player, wearable device (e.g., an electronic watch, health monitoring device, or fitness tracking device), augmented reality (AR) device, virtual reality (VR) device, mixed reality (MR) device, gaming device, portable terminal, vehicle navigation system, robot navigation system, or the like. It should also be appreciated that the camera assembly 100 may have any suitable orientation within the electronic device 10 to achieve a particular orientation of the cameras of the camera assembly 100 within the device 10.

FIG. 1B shows a top perspective view of the first camera assembly 100, having an upper housing 140 and a lower housing 195 that together form an enclosure for housing various components of the first camera assembly 100. The upper housing 140 and the lower housing 195 may be formed from a metal and act as a shield (e.g., to shield against electromagnetic interference). In some non-limiting embodiments, as shown in FIGS. 1B-1D, the upper housing 140 and the lower housing 195 together form an enclosure having a cuboidal shape, though it should be appreciated that the enclosure may be formed with any suitable shape as may be desired. The first camera assembly 100 may include a first lens module 110 and a second lens module 160, a portion of each of which may protrude outward from a first opening

145*a* and a second opening 145*b*, respectively, of the upper housing 140. The first lens module 110 has an optical axis 110*a*, while the second lens module 160 has an optical axis 160*a*.

FIGS. 1C-1D depict internal structure of the first camera assembly 100 through an exploded perspective view and a corresponding cross-sectional side view respectively. The first camera assembly 100 includes the first lens module 110 and the second lens module 160, each of which includes one or more lens elements. Each of the first lens module 110 and the second lens module 160 may include a lens barrel that houses and holds various optical elements of the corresponding lens module (e.g., lens elements, aperture layers, filters or the like). In some embodiments, the lens barrel of each of the first lens module 110 and the second lens module 160 may serve to hold some or all of the optical elements in a fixed relationship.

Each of the first lens module 110 and the second lens module 160 is independently moveable along the respective optical axes 110*a*, 160*a*, which may provide autofocus (AF) functionality to each of the lens modules. The first lens module 110 and the second lens module 160 are each moveably housed within the first camera assembly 100, for example through a respective actuator, which is turn controls the movement thereof. In the embodiments shown in FIGS. 1C-1D, the first lens module 110 and the second lens module 160 are moveably connected within the first camera assembly 100 through a first actuator 185 and a second actuator 190, respectively, housed within the enclosure (e.g., positioned at least partially within the upper housing 140).

The first actuator 185 includes a first lens carrier 112 for supporting the first lens module 110, while the second actuator 190 includes a second lens carrier 162 for supporting the second lens module 160. In some embodiments, each of the first lens carrier 112 and the second lens carrier 162 have a respective opening 119, 169 extending through them for accommodating the first lens module 110 and the second lens module 160, respectively. The first lens carrier 112 may be configured to carry one or more first coils 116, 118 of the first actuator 185. The second lens carrier 162 may be configured to carry one or more second coils 166, 168 of the second actuator 190. For example, in the embodiment shown in FIGS. 1C-1D, the first lens carrier 112 includes two flanges 113 along opposite sides thereof for supporting the first coils 116, 118 of the first actuator 185. Similarly, the second lens carrier 162 further includes two flanges 167 along opposite sides thereof for supporting the second coils 166, 168 of the second actuator 190.

The first actuator 185 includes a first set of magnets. In the variation shown in FIGS. 1C-1D, the first actuator 185 includes a first magnet 114 and a shared magnet 145 common with the second actuator 190. These magnets 114, 145 may be positioned on opposite sides of the first lens carrier 112. A first set of suspension elements 165*a*. 165*b* (e.g., a set of sheet springs) moveably connects the first lens carrier 112 to a first set of "fixed" locations in the first camera assembly 100, which allows the first lens carrier 112 to be controllably moved relative to these fixed locations by the first actuator 185. While the first set of suspension elements 165*a*, 165*b* are depicted schematically by two springs extending between the flanges 113 and the magnets 114, 145, it should be appreciated that the first set of suspension elements 165*a*, 165*b* may be connected from any suitable portion(s) of the first lens carrier 112 to another component or components of the first camera assembly (e.g., a portion of the upper housing 140, or another component mounted thereto). Accordingly, the first set of suspension elements 165*a*, 165*b* may suspend and allow for relative movement of the first lens module 110 within the first camera assembly 100. Specifically, current may be driven through the first coils 116, 118, which may generate a magnetic fields that interact with corresponding magnetic fields the first magnet 114 and/or the shared magnet 145. This may generate a Lorentz force causes a first lens module 110 to move vertically along the optical axis 110*a*, thereby providing auto focus (AF) functionality.

The second actuator 190 includes a second set of magnets. In the variation shown in FIGS. 1C-1D, the second actuator 190 includes a second magnet 164 and the shared magnet 145 common with the first actuator 185. These magnets 145, 164 may be positioned on opposite sides of the second lens carrier 162. A second set of suspension elements 165*c*, 165*d* (e.g., a set of sheet springs) moveably connects the second lens carrier 162 to a second set of "fixed" locations in the first camera assembly 100, which allows the second lens carrier 162 to be controllably moved relative to these fixed locations by the second actuator 190. While the second set of suspension elements 165*c*, 165*d* are depicted schematically by two springs extending between the flanges 167 and the magnets 145, 164, it should be appreciated that the second set of suspension elements 165*c*. 165*d* may be connected to any suitable portion to any suitable portions of the second lens carrier 162 and another component or components of the first camera assembly 100 (e.g., a portion of the upper housing 140, or another component mounted thereto). Accordingly, the second set of suspension elements 165*c*, 165*d* may suspend and allow for relative movement of the second lens module 160 within the first camera assembly 100. Specifically, current may be driven through the second coils 166, 168, which may generate a magnetic fields that interact with corresponding magnetic fields the second magnet 164 and/or the shared magnet 145. This may generate a Lorentz force causes a second lens module 160 to move vertically along the optical axis 160*a*, thereby providing auto focus (AF) functionality. Because the first and second actuators 185, 190 share a common magnet 145, the coils of these actuators (i.e., the coil 118 of the first actuator 185 and the coil 168 of the second actuator 190) may experience opposite polarities of the common magnet 145. In these instances, current may be driven through these coils 118, 168 in opposite directions to move the respective lens modules 110, 160 in the same direction. In some embodiments, the first magnet 114, the second magnet 164, and the shared magnet 145 are dual-pole magnets in which each magnet has multiple magnetization directions, and thereby includes two pairs of poles.

The first camera assembly 100 further includes a first image sensor module 120 and a second image sensor module 170. The first image sensor module 120 is positioned to receive light from the first lens module 110 (e.g., to form a first camera of the first camera arrangement 100), while the second image sensor module 170 is positioned to receive light from the second lens module 160 (e.g., to form a second camera of the first camera arrangement 100). The first actuator 185 is configured to move the first lens module 110 vertically along the optical axis 110*a* to focus and capture light from the first lens module 110 into the first image sensor module 120. Similarly, the second actuator 190 is configured to move the second lens module 160 vertically along the optical axis 160*a* to focus and capture light from the second lens module 160 into the second image sensor module 170.

The first lens module 110 and the second lens module 160 are disposed over a base plate 150 that is housed within the enclosure of the first camera arrangement 100. In some instances, the base plate 150 is mechanically attached to the upper housing 140 and supported by the lower housing 195. However, in other embodiments, the base plate 150 may be mechanically attached to the lower housing 195 and supported by the upper housing 140. The base-plate 150 may be shaped in congruence with the shapes of the upper housing 140 and the lower housing 195. While in some non-limiting embodiments, the base plate 150 is rectangular in shape, in other embodiments, it may be any other polygonal shape. In some embodiments, the base plate 150 has rounded or chamfered corners.

The base plate 150 has an upper surface 151 and a lower surface 159. The base plate 150 defines a first aperture 155*a* and a second aperture 155*b* extending therethrough for allowing light captured by the first lens module 110 and the second lens module 160 to be transmitted to the first image sensor module 120 and the second image sensor module 170, respectively. In some instances, the base plate 150 may provide electrical connection from between one or more of the first image sensor module 120 and the second image sensor module 170 (e.g., a flexible printed circuit thereof) to the first actuator 185 and the second actuator 190. This may allow power and/or control signals to be routed to the first actuator 185 and second actuator 190, from one or more components of the image sensor modules 120, 170 and/or from outside the first camera assembly 100.

The first image sensor module 120 and the second image sensor module 170 are each mounted to the lower surface 159 of the base plate 150. The first image sensor module 120 includes a first image sensor 128 aligned with the first lens module 110 along the optical axis 110*a*. The first image sensor 128 is positioned to receive light captured by the first lens module 110 through the first aperture 155*a* of the base plate 150 and convert the captured light into image signals. The first image sensor module 120 may include a first substrate 126 coupled to the lower surface 159 of the base plate 150 using a bonding agent 122. The bonding agent 122 allows for the first image sensor module 120 to be adjusted, during assembly, with respect to the first lens module 110 to achieve a desired alignment therebetween.

Depending on the design of the first image sensor module 120, and as shown in the embodiment of FIGS. 1C-1D, the first substrate 126 may define an opening 129 extending therethrough to allow light from the first lens module 110 to be transmitted to the first image sensor module 120. The first substrate 126 may further include an inner rim (optionally, a flanged inner rim) around the opening 129. The first substrate 126 serves to provide mechanical support to hold the first image sensor module 120 within the first camera assembly 100 via the base plate 150, and provide electrical connections from other components (e.g., first flexible printed circuit 130 described below) to the first image sensor module 120. The opening 129 along with the first aperture 155*a* of the base plate 150, the opening 119 of the first lens carrier 112, and the first opening 145*a* of the upper housing 140 form a path for light from the first lens module 110 to reach the first image sensor module 120. A first infrared filter 124 and the first image sensor 128 may be coupled to and mechanically supported by a top surface and a bottom surface, respectively, of the first substrate 126. The first image sensor module 120 further includes a first flexible printed circuit 130 coupled to the first substrate 126 and/or the first image sensor 128. The first flexible printed circuit 130 is electrically connected (e.g., via the first substrate 126) to the first image sensor 128. In some embodiments, the first flexible printed circuit 130 may extend externally from the first camera assembly 100 to route power, control, and/or other signals (e.g., image data) therefrom and/or thereto.

Similarly, the second image sensor module 170 includes a second image sensor 178 aligned with the second lens module 160 along the optical axis 160*a*. The second image sensor 178 is positioned to receive light captured by the second lens module 160 through the second aperture 155*b* of the base plate 150 and convert the captured light into image signals. The second image sensor module 170 includes a second substrate 176 coupled to the lower surface 159 of the base plate 150 using a bonding agent 172. The bonding agent 172 allows for the second image sensor module 170 to be adjusted, during assembly, with respect to the second lens module 160 to achieve a desired alignment therebetween.

Depending on the design of the second image sensor module 170, and as shown in the embodiment of FIGS. 1C-1D, the second substrate 176 may define an opening 179 extending therethrough to allow light from the second lens module 160 to be transmitted to the second image sensor module 170. The second substrate 176 may further include an inner rim (optionally, a flanged inner rim) around the opening 179. The second substrate 176 serves to provide mechanical support to hold the second image sensor module 170 within the first camera assembly 100 via the base plate 150, and may provide electrical connections from other components (e.g., first flexible printed circuit 130 described below) to the second image sensor module 170. The opening 179 along with the second aperture 155*b* of the base plate 150, the opening 169 of the second lens carrier 162, and the second opening 145*b* of the upper housing 140 form a path for light from the second lens module 160 to reach the second image sensor module 170. A second infrared filter 174 and the second image sensor 178 may be coupled to and mechanically supported by a top surface and a bottom surface, respectively, of the second substrate 176. The second image sensor module 170 further includes a second flexible printed circuit 180 coupled to the second substrate 176 and/or the second image sensor 178. The second flexible printed circuit 180 is electrically connected (e.g., via the second substrate 176) to the second image sensor 178. In some embodiments, the second flexible printed circuit 180 may extend externally from the first camera assembly 100 to route power, control, and/or other signals (e.g., image data) therefrom and/or thereto.

Figure 2A:
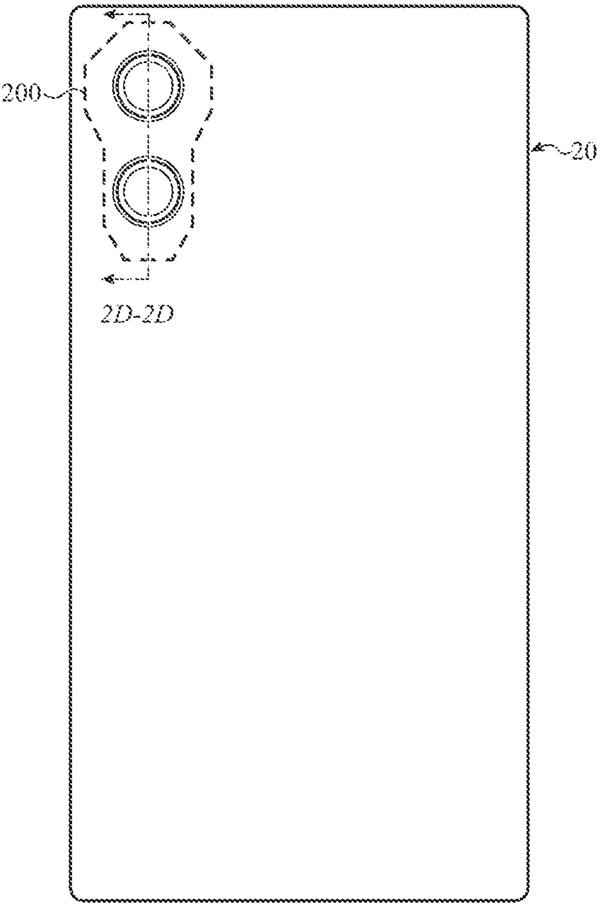
FIG. 2A shows a rear view of an example mobile electronic device having a second example camera assembly disposed thereon, according to certain aspects of the present disclosure.
Figure 2B:
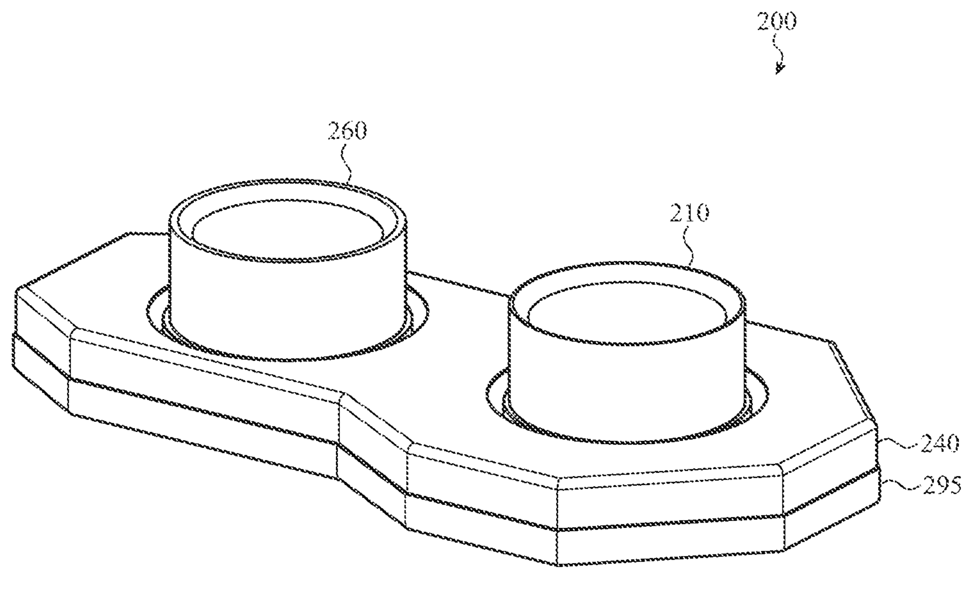
FIG. 2B shows a top perspective view of the second example camera assembly of FIG. 2A, according to certain aspects of the present disclosure.
Figure 2C:
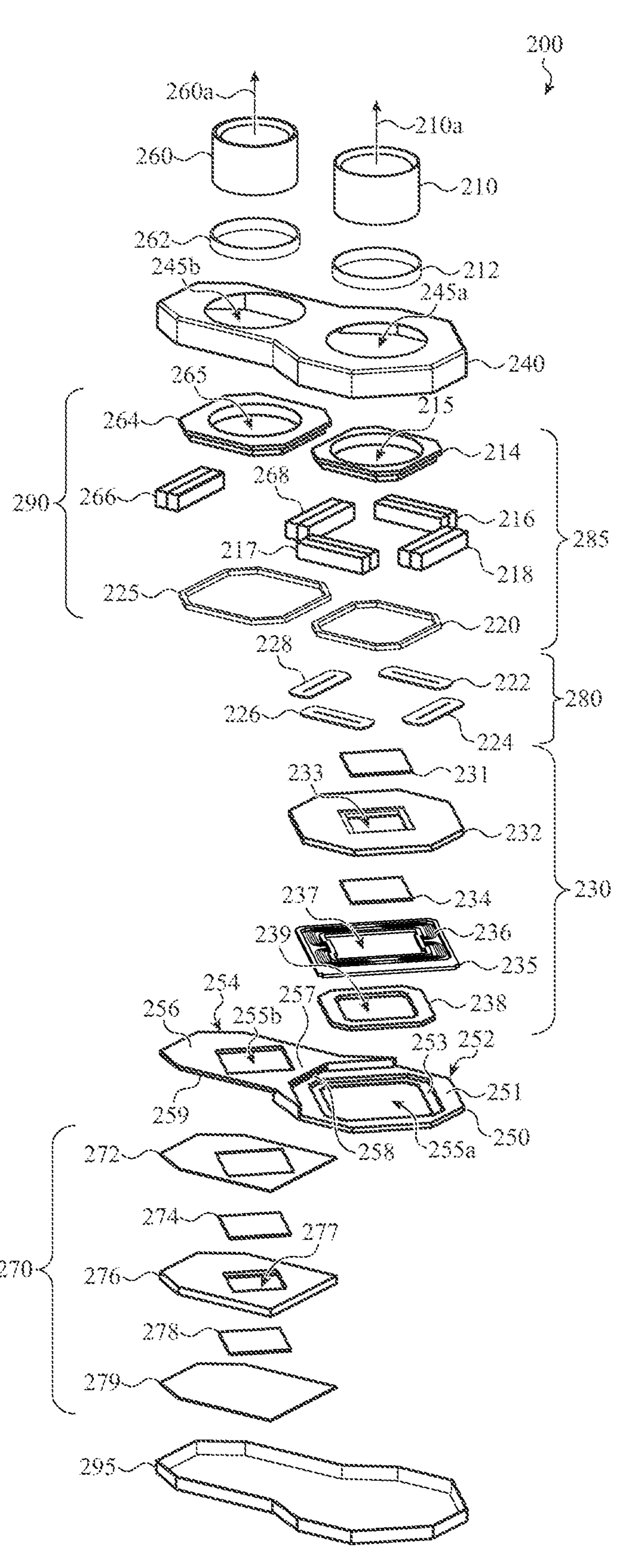
FIG. 2C shows an exploded perspective view of the second example camera assembly of FIG. 2A, according to certain aspects of the present disclosure.
Figure 2D:
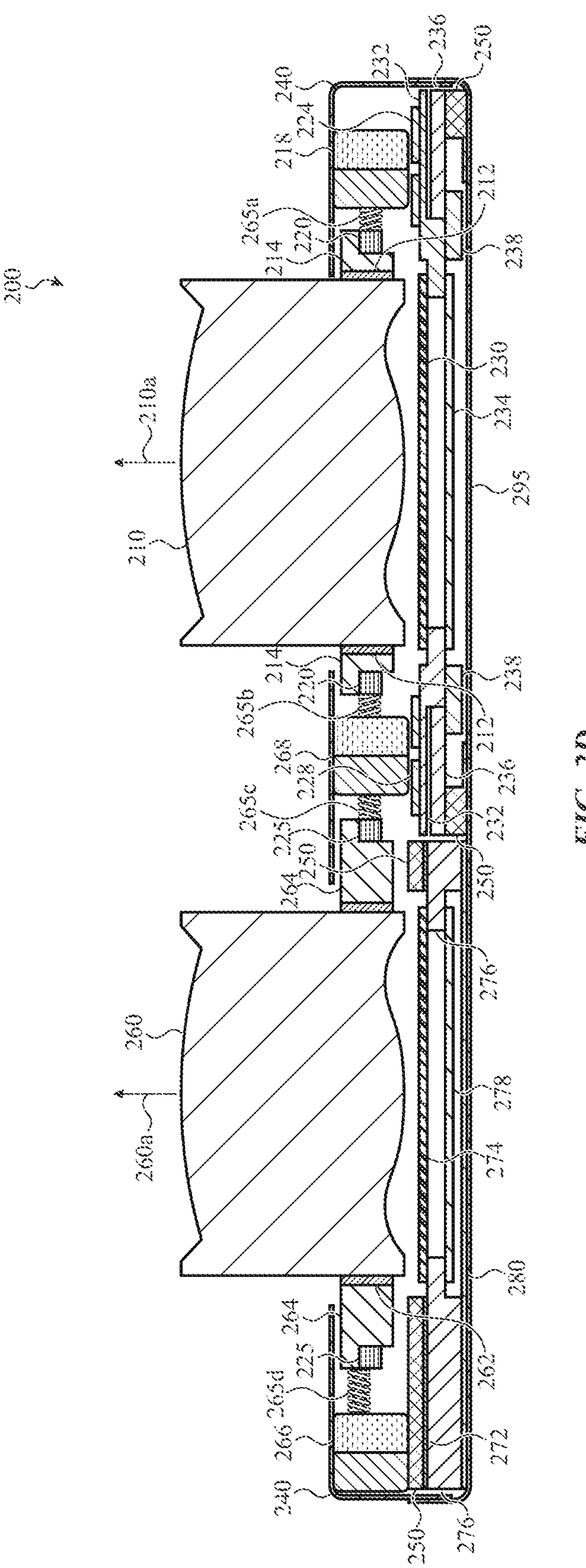
FIG. 2D shows a cross-sectional side view of the second example camera assembly of FIG. 2A, taken along line 2D-2D, according to certain aspects of the present disclosure.

FIG. 2A shows a rear view of an example electronic device 20 having a second example camera assembly 200 disposed thereon, while FIGS. 2B-2D show a top perspective view, an exploded perspective view, and a cross-sectional side view of the second camera assembly 200. As discussed above, the electronic device 20 maybe a mobile phone or another portable electronic device. It should also be appreciated that the camera assembly 200 may have any suitable orientation within the electronic device 20 to achieve a particular orientation of the cameras of the camera assembly 200 within the device 20.

FIG. 2B shows a top perspective view of the second camera assembly 200, having an upper housing 240 and a lower housing 295 that together form an enclosing box for housing components of the second camera assembly 200. The upper housing 240 and the lower housing 295 may be formed from a metal and act as a shield. In some non-limiting embodiments, as shown in FIGS. 2B-2D, the upper housing 240 and the lower housing 295 have a polygonal shape. In some embodiments, as shown in FIGS. 2B-2D, the upper housing 240 and the lower housing 295 each have the same polygonal shape, where a width of a first portion of each of the upper and lower housing 240, 295 (e.g., supporting a first lens module 210) is greater than a width of a second portion of each of the upper and lower housings 240, 295 (e.g., supporting a second lens module 260). The first lens module 210 and the second lens module 260 may protrude outwards from a first opening 245*a* in the first portion and a second opening 245*b* in the second portion, respectively, of the upper housing 240. The first lens module 210 has an optical axis 210*a*, while the second lens module 260 has an optical axis 260*a*.

FIGS. 2C-2D depict internal structure of the second camera assembly 200 through an exploded perspective view and a corresponding cross-sectional side view respectively. The second camera assembly 200 includes a first lens module 210 and a second lens module 260, each of which includes one or more lens elements. Each of the first lens module 210 and the second lens module 260 may include a lens barrel that houses and holds various optical elements of the corresponding lens module (e.g., lens elements, aperture layers, filters or the like). In some embodiments, the lens barrel of each of the first lens module 210 and the second lens module 260 may serve to hold some or all of the optical elements in a fixed relationship.

Each of the first lens module 210 and the second lens module 260 is independently moveable along the respective optical axes 210*a*. 260*a*, which may provide autofocus (AF) functionality to each of the lens modules. The first lens module 210 and the second lens module 260 are each moveably housed within the second camera assembly 200, for example through a respective actuator, which in turn controls the movement thereof. Additionally, a first image sensor module 230 is moveably housed in the second camera assembly 200 via an actuator that controls the movement thereof. In the embodiments shown in FIGS. 2C-2D, the first image sensor module 230 is moveably connected within the first camera assembly through a first actuator 280, while the first lens module 210 and the second lens module 260 are moveably connected within the second camera assembly 200 through a second actuator 285 and a third actuator 290 respectively. The first actuator 280, the second actuator 285, and the third actuator 290, respectively are housed within the enclosure (e.g., positioned at least partially within upper housing 240). The first actuator 280 facilitates lateral movement of components of the first image sensor module 230 along a plane perpendicular to the optical axis 210*a*. The second actuator 285 facilitates vertical movement of the first lens module 210 along the optical axis 210*a*, while the third actuator 290 facilitates vertical movement of the second lens module 260 along the optical axis 260*a*.

Each of the first actuator 280, the second actuator 285, and the third actuator 290 include one or more coils and one or more magnets, where current may be driven through coils of a given actuator to prompt movement as discussed above. Optionally, at least one shared magnet (e.g., magnet 268) may be shared between the first actuator 280, the second actuator 285, and/or the third actuator 290, which allows savings in both device space and cost. For example, the first actuator 280 includes a first plurality of coils disposed around a first substrate 232 of the first image sensor module 230, and a first plurality of magnets that interact with current flow in the plurality of coils. As shown in the example embodiment of FIGS. 2C-2D, the plurality of coils include four coils 222, 224, 226, 228 are symmetrically positioned around and supported by the first substrate 232. The set of magnets includes four magnets 216, 217, 218, 268, and each of the four coils 222, 224, 226, 228 may be positioned to a correspond magnet. In operation, at least one of the coils 222, 224, 226, 228 may be configured to drive a current therethrough that causes the respective one of the coils 222, 224, 226, 228 to produce a magnetic field that interacts with at least one magnetic field of the magnets 216, 217, 218, 268. The number of coils receiving current (as well as the respective current driven through each coil) controls a direction along which the first image sensor module 230 moves laterally along a plane perpendicular to the optical axis 210*a*. This movement may occur while capturing images using the first image sensor module, thereby providing optical image stabilization (OIS) functionality.

The second actuator 285 includes a first lens carrier 214 with a central opening 215 extending therethrough for supporting the first lens module 210. The second actuator includes a second plurality of magnets. In the example embodiment shown in FIGS. 2C-2D, the second plurality of magnets includes three magnets 216, 217, 218, and a shared magnet 268, which may be disposed symmetrically adjacent to four sides of the first lens carrier 214. The shared magnet 268 is common with both the first actuator 280 and the third actuator 290. A first set of suspension elements 265*a*, 265*b* (e.g., a set of sheet springs) moveably connects the first lens carrier 214 to a first set of "fixed" locations in the second camera assembly 200, which allows the first lens carrier 214 to be controllably moved relative to these fixed locations by the second actuator 285. While the first set of suspension elements 265*a*, 265*b* are depicted schematically by two springs extending between the first lens carrier 214 and the magnets 218, 268, it should be appreciated that the first set of suspension elements 265*a*. 265*b* may be connected to any suitable portion to any suitable portions of the first lens carrier 214 and another component or components of the first camera assembly (e.g., a portion of the upper housing 240, or another component mounted thereto). Accordingly, the first set of suspension elements 265*a*. 265*b* may suspend and allow for relative movement of the first lens module 210 within the second camera assembly 200.

The second actuator 285 further includes a first coil 220 disposed between the first lens module 210 and the magnets 216, 217, 218, 268. In the example embodiment shown in FIGS. 2C-2D, the first coil 220 encircles the first lens carrier 214 and may thereby also the first lens module 210. In some non-limiting embodiments such as shown in FIG. 2C, the first coil 220 may be accommodated under a flanged outer rim of the first lens carrier 214 for connecting to and supporting the first lens carrier 214. In some embodiments, the first lens module 210 is optionally bonded to the first lens carrier 214 through a first bonding agent 212, which may facilitate controllable alignment therebetween during assembly. In operation, the first coil 220 may be configured to receive a current that creates a magnetic field that interacts with at least one magnetic field of the magnets 216, 217, 218, 268. This causes the first lens module 210 to move vertically along the optical axis 210*a*, thereby providing auto focus (AF) functionality.

The third actuator 290 includes a second lens carrier 264 with a central opening 265 extending therethrough for supporting the second lens module 260. The third actuator includes a third plurality of magnets. In the example embodiment shown in FIGS. 2C-2D, the third plurality of magnets includes magnet 266 and a shared magnet 268 disposed on opposite sides of the second lens carrier 264. The shared magnet 268 is common with both the first actuator 280 and second actuator 285. A second set of suspension elements 265*c*. 265*d* (e.g., a set of sheet springs) moveably connects the second lens carrier 264 to a second set of "fixed" locations in the second camera assembly 200, which allows the second lens carrier 264 to be controllably moved relative to these fixed locations by the third actuator 290. While the second set of suspension elements 265*c*, 265*d* are depicted schematically by two springs extending between the second lens carrier 264 and the magnets 266, 268, it should be appreciated that the second set of suspension elements 265*c*, 265*d* may be connected from any suitable portion(s) of the second lens carrier 264 to another component or components of the second camera assembly 200 (e.g., a portion of the upper housing 240, or another component mounted thereto). Accordingly, the second set of suspension elements 265*c*, 265*d* may suspend and allow for relative movement of the second lens module 264 within the second camera assembly 200.

The third actuator 290 further includes a second coil 225 disposed between the second lens module 260 and the magnets 266, 268. In the example embodiment shown in FIGS. 2C-2D, the second coil 225 encircles the second lens carrier 264 and may thereby also the second lens module 260. In some non-limiting embodiments such as shown in FIG. 2C, the second coil 225 may be accommodated under a flanged outer rim of the second lens carrier 264 for connecting to and supporting the second lens carrier 264. In some embodiments, the second lens module 260 is optionally bonded to the second lens carrier 264 through a bonding agent 262, which may facilitate controllable alignment therebetween during assembly. In operation, the second coil 225 may be configured to receive a current that creates a magnetic field that interacts with at least one magnetic field of the magnets 266, 268. This causes the second lens module 260 to move vertically along the optical axis 260*a*, thereby providing auto focus (AF) functionality.

Because the second and third actuators 285, 290 share a common magnet 268, the coils of these actuators (i.e., the coil 220 of the second actuator 285 and the coil 225 of the third actuator 290) may experience opposite polarities of the common magnet 268. In these instances, current may be driven through these coils 220, 225 in opposite directions to move the respective lens modules 210, 260 in the same direction. In these instances, the remaining magnets may be polarized to facilitate this movement. In some non-limiting embodiments, the magnets 216, 217, 218, 266, and the shared magnet 268 are dual-pole magnets such as described previously.

As mentioned previously, the first actuator 280 is configured to move the first image sensor module 230 in a lateral direction along a plane perpendicular to the optical axis 210*a*, thereby providing OIS functionality. This helps capture light from the first lens module 210 into the second camera assembly 200 that could not be otherwise captured due to external disturbance that can move the electronic device 20 away. The second actuator 285 is configured to move the first lens module 210 in a vertical direction along the optical axis 210*a* to focus and capture light from the first lens module 210 into a first image sensor 234 as described below. Similarly, the third actuator 290 is configured to move the second lens module 260 in a vertical direction along the optical axis 260*a* to focus and capture light from the second lens module 260 into a second image sensor 278 as described below.

As shown in the example embodiments of FIGS. 2C-2D, the first lens module 210 and the second lens module 260 are disposed over a base plate 250. In some instances, the base plate 250 is mechanically attached to the upper housing 240 and supported by the lower housing 295. However, in other embodiments, the base plate 250 may be mechanically attached to the lower housing 295 and supported by the upper housing 240. The base-plate 250 may be shaped in congruence with the shapes of the upper housing 240 and the lower housing 295. For example, in variation shown in FIGS. 2C-2D, the base plate 250 is shaped such that a width of a first portion 252 is greater than a width of a second portion 254. The base plate 250 is designed such that the first image sensor module 230 is mounted above the base plate 250 and the second image sensor module 270 is mounted below the base plate 250.

Figure 3:
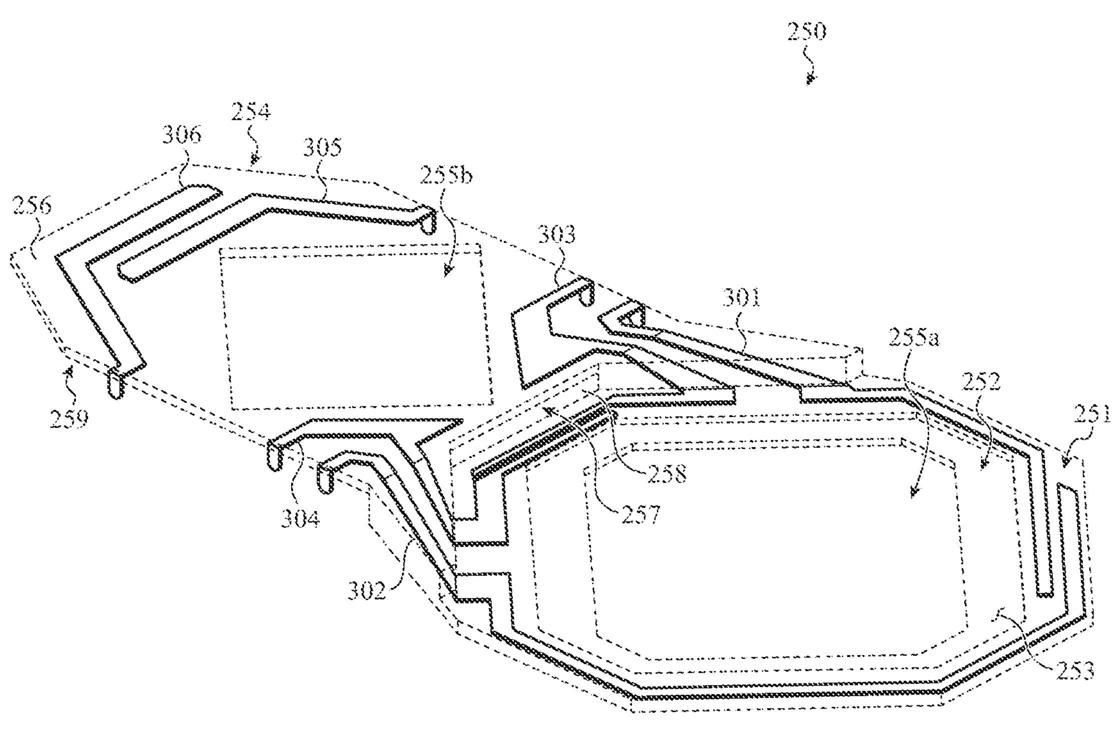
FIG. 3 shows a top perspective view of an example base plate in the second example camera assembly of FIG. 2A that includes a plurality of electrical traces, according to certain aspects of the present disclosure.

In addition to FIG. 2C, reference can also be made to FIG. 3, which shows a top perspective view of base plate 250 in the second camera assembly 200. The base plate 250 has a first portion 252 for supporting the first image sensor module 230 and a second portion 254 for supporting the second image sensor module 270. The first portion 252 has an upper surface 251 and an optionally recessed surface 253, and defines a first aperture 255*a* extending through the first portion 252. The first portion 252, in some variations, may be directly attached to the lower housing 295 at a lower surface of the first portion 252.

The second portion 254 has an upper surface 256 and a lower surface 259. The second portion 254 defines a second aperture 255*b* extending between the upper surface 256 and the lower surface 259. The upper surface 256 of the second portion 254 is elevated relative to the upper surface 251 of the first portion 252. A connecting portion 257 extends between the first portion 252 and the second portion 254 for providing a structural transition between the upper surface 251 of the first portion 252 and the upper surface 256 of the second portion 254. The connecting portion 257 may include a channel 258 (that extends vertically and/or horizontally through the connecting portion 257) for accommodating lateral movement of a sensor-shift flexure 235 (described below) due to transverse movement of the first image sensor module 230 along a plane orthogonal to the optical axis 210*a*.

As further illustrated with respect to FIG. 3, the base plate 250 may include a plurality of electrical traces for routing electrical signals (e.g., drive signals, image signals, and/or power signals) in the first portion 252, the second portion 254, and the connecting portion 257. The plurality of electrical traces allow for a flexible printed circuit (e.g., flexible printed circuit 279) to provide electrical connections to the various components of the first image sensor module 230 and the second image sensor module 270. Further, the plurality of electrical traces provide electrical connections to the first actuator 280 and the second actuator 285. Accordingly, the base plate 250 may facilitate electrical connection between image sensor modules and actuators (e.g., from the second second image sensor module 270 to the third actuator 290) and/or between the image sensor modules (e.g., from the second image sensor module 270 to the first image sensor module 230).

The electrical traces may traverse different portions of the base plate 250. For example, as shown in FIG. 3, the base plate 250 includes electrical traces 301, 302, 303, 304 that traverse from the first portion 252 to the second portion 254 through the connecting portion 257. Each of the electrical traces 301, 302, 303, 304 has a first segment positioned in the first portion 252, a second segment positioned in the connecting portion 257, and a third segment positioned in the second portion 254. Each of the electrical traces 301, 302, 303, 304 may have exposed regions in the first portion 252 and the second portion 254, but may otherwise be encapsulated within the base plate 250 to prevent shorts or unintentional electrical connections to these electrical traces. The exposed regions may provide contact points for electrically connecting each of the electrical traces 301, 302, 303, 304 to a respective component of the second camera assembly 200. As shown in FIG. 3, the second portion 254 also includes the electrical traces 305, 306 that are entirely positioned in the second portion 254. It should be appreciated that the set of electrical traces 301-306 depicted in FIG. 3 is just one example, and that the base plate 250 may include different arrangements of electrical traces to provide any suitable electrical connections between components of the camera arrangements as described herein.

Referring back to FIGS. 2C-2D, the first image sensor module 230 is mounted on the upper surface 251 of the first portion 252 on the base plate 250. The first image sensor module 230 includes a first substrate 232 and a first image sensor 234. The first substrate 232 may have a flanged outer rim and a central aperture 233 extending therethrough. The first substrate 232 may be electrically connected (e.g., via a sensor-shift flexure 235) to the upper surface 251 of the first portion 252 of the base plate 250. This may allow for electrical signals to be routed to and from the first image sensor module 230. As noted above, the first substrate 232 supports the four coils of the first actuator 280. In some non-limiting embodiments as shown in FIGS. 2C-2D, the first image sensor 234 and the first substrate 232 are each mounted on the sensor-shift flexure 235. In other non-limiting embodiments, the first image sensor 234 may be electrically connected to the first substrate 232, which in turn may be electrically connected to the sensor-shift flexure 235. In some instances, the first substrate 232 is configured to electrically connect the first image sensor 234 to the electrical traces on the base plate 250.

A first infrared filter 231 and/or the first image sensor 234 may be coupled to and mechanically supported by one or more surfaces of the first substrate 232 and/or the sensor-shift flexure 235. The first image sensor module 230 may also include a fender 238 that is moveably disposed in the recessed surface 253 of the first portion 252 in the base plate 250. The fender 238 may be positioned, upon assembly, in the first aperture 255*a*, which may limit the extent of lateral movement of the fender 238. Thus, the fender 238 is configured, when assembled, to restrict movement of the first image sensor module 230 in a lateral direction along a plane perpendicular to the optical axis 210*a*.

The first image sensor 234 may be aligned with the first lens module 210 along the optical axis 210*a*. The first image sensor 234 is positioned to receive the light captured by the first lens module 210 through the central aperture 233 of the first substrate 232, and convert the captured light into image signals. Accordingly, the first image sensor module 230 and the first lens module 210 may form a first camera of the second camera arrangement 200.

The sensor-shift flexure 235 moveably connects the first image sensor 234 to the base plate 250, and enables the first actuator 280 to provide optical image stabilization (OIS) to the first image sensor module 230. The sensor-shift flexure 235 may optionally include one or more electrical traces that allow for electrical connections between the base plate 250 and other components of the first image sensor module 230. The sensor-shift flexure 235 has a number of flexures 236 and, optionally, a central aperture 237 extending therethrough. The flexures 236 may suspend components of the first image sensor module 230 relative to the base plate 250, and have sufficient flexibility to allow the first actuator 280 to move the first image sensor 234 laterally along a plane orthogonal to the optical axis 210*a* to allow for optical image stabilization (OIS) of the images captured by the first image sensor 234. Further details of the sensor-shift flexure 235 and flexure-based arrangement for moving an image sensor can be obtained by referring to U.S. Pat. No. 10,924,675 B2, titled "Optical image stabilization with voice coil motor for moving image sensor", the entire contents of which are incorporated by reference herein.

Referring again to FIGS. 2C-2D, the second image sensor module 270 is mounted to the lower surface 259 of the second portion 254 on the base plate 250, via a bonding agent 272. The bonding agent 272, as an alternative to or in addition to the bonding agent 262, can facilitate alignment of the second image sensor module 270 with the second lens module 260 during assembly. The second image sensor module 270 includes a second substrate 276 and a second image sensor 278. The second substrate 276 may include a flanged inner rim and a central aperture 277 extending therethrough. The second substrate 276 may be configured to electrically connect the second image sensor 278, to allow for electrical connection between the second image sensor 278 through the second substrate 276. A second infrared filter 274 and the second image sensor 278 may be coupled to and mechanically supported by a top surface and a bottom surface, respectively, of the second substrate 276.

In some instances, the second substrate 276 may be electrically connected to electrical traces (e.g., some or all of the electrical traces 301-306) on the base plate 250, to allow for electrical connection between the second image sensor module 270 and other components of the second camera arrangement 200 (e.g., the first image sensor module 230, the first actuator 280, the second actuator 285, and/or the third actuator 290). The second image sensor module 270 may further include a flexible printed circuit 279 coupled to the second substrate 276, the second image sensor 278, and/or to the lower surface 259 of the second portion 254 on the base plate 250. In some embodiments, the flexible printed circuit 279 may extend externally from the second camera assembly 200 to route power, control, and/or other signals (e.g., image data) therefrom and/or thereto. In this way the flexible printed circuit 279 may route external signals to and/from different components of the second camera arrangement 200 (e.g., the first image sensor module 230, the first actuator 280, the second actuator 285, and/or the third actuator 290) via the second image sensor module 270.

The second image sensor 278 is aligned with the second lens module 260 along the optical axis 260*a*, and may form a second camera of the second camera arrangement 200. The second image sensor 278 is positioned to receive the light captured by the second lens module 260 through the second aperture 255*b* of the second portion 254 on the base plate 250, and convert the captured light into image signals.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description, and not limitation. They are not targeted to be exhaustive or to limit the embodiments to the precise forms disclosed. It will be apparent to one of ordinary skill in the art, after reading this description, that many modifications and variations are possible in view of the above teachings or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A camera assembly comprising:
a first lens module;
a second lens module;
a lens carrier supporting the second lens module;
a base plate comprising:
a first portion having an upper surface; and
a second portion having an upper surface and a lower surface and defining an aperture extending therethrough, wherein the upper surface of the second portion is elevated relative to the upper surface of the first portion;
a first image sensor module mounted on the upper surface of the first portion, the first image sensor module having a first image sensor;
a first actuator configured to move the first image sensor in a lateral direction; and
a second image sensor module mounted to the lower surface of the second portion, wherein:
the second portion is positioned between the lens carrier and the second image sensor module;
the aperture is positioned between the second lens module and the second image sensor module; and
the second image sensor module comprising a second image sensor positioned to receive light through the aperture.

2. The camera assembly of claim 1, wherein the base plate further includes a connecting portion extending between the first portion and the second portion for aligning the first image sensor module and the second image sensor module.

3. The camera assembly of claim 2, wherein the base plate further includes a plurality of electrical traces in the first portion, the second portion, and the connecting portion, at least one electrical trace providing an electrical connection between the first image sensor module and the second image sensor module.

4. The camera assembly of claim 1, wherein:
the first lens module comprising a first lens with a first optical axis; and
the second lens module comprising a second lens with a second optical axis.

5. The camera assembly of claim 4, further comprising:
a second actuator configured to move the first image sensor module along a vertical direction to focus light from the first lens on the first image sensor; and
a third actuator comprising the lens carrier and configured to move the second image sensor module along the vertical direction to focus light from the second lens on the second image sensor, the third actuator having a magnet shared by the second actuator to generate magnetic fields for moving both the first lens module and the second lens module.

6. The camera assembly of claim 5, wherein the second actuator comprises:
the first set of magnets; and
a second set of coils disposed between the first lens module and the first set of magnets.

7. The camera assembly of claim 5, wherein the third actuator comprises:
a second set of magnets disposed above the second image sensor module; and
a third set of coils disposed between the second lens module and the second set of magnets.

8. The camera assembly of claim 1, wherein the first actuator comprises:
a first set of magnets disposed above the first image sensor module; and
a first set of coils positioned adjacent to the first set of magnets and configured to magnetically interact with the first set of magnets to actuate the first image sensor in the lateral direction, wherein each respective coil of the first set of coils is disposed below a respective one of the first set of magnets.

9. The camera assembly of claim 1, wherein a width of the first portion is greater than a width of the second portion.

10. A camera assembly comprising:
a base plate comprising:
a first portion having an upper surface; and
a second portion having an upper surface and a lower surface and defining an aperture extending therethrough, wherein the upper surface of the second portion is elevated relative to the upper surface of the first portion;
a first image sensor module mounted on the upper surface of the first portion, the first image sensor module having a first image sensor;
a second image sensor module mounted to the lower surface of the second portion, the second image sensor module having a second image sensor positioned to receive light through the aperture;
a first lens module disposed above the base plate for transmitting light to the first image sensor, the first lens module having a first lens with a first optical axis;
a second lens module disposed above the base plate for transmitting light to the second image sensor through the aperture, the second lens module having a second lens with a second optical axis; and
a lens carrier supporting the second lens module, wherein:
the second portion is positioned between the lens carrier and the second image sensor module.

11. The camera assembly of claim 10, further comprising:
a first actuator configured to move the first image sensor module in one or more directions orthogonal to the first optical axis;
a second actuator configured to move the first image sensor module vertically along the first optical axis to focus light from the first lens on the first image sensor; and
a third actuator comprising the lens carrier and configured to move the second image sensor module vertically along the second optical axis to focus light from the second lens on the second image sensor, the third actuator having a magnet shared by the second actuator to generate magnetic fields usable in creating motion in both the second actuator and the third actuator.

12. The camera assembly of claim 10, further comprising a substrate configured to electrically connect the first image sensor and the base plate.

13. The camera assembly of claim 10, wherein the base plate further includes a connecting portion extending between the first portion and the second portion for aligning the first image sensor module and the second image sensor module.

14. The camera assembly of claim 13, wherein the base plate further includes a plurality of electrical traces in the first portion, the second portion, and the connecting portion, at least one electrical trace providing an electrical connection between the first image sensor module and the second image sensor module.

15. The camera assembly of claim 13, wherein the connecting portion includes a vertical channel for accommodating lateral movement of the first image sensor module in a direction orthogonal to the first optical axis.

16. The camera assembly of claim 10, wherein the first image sensor module further includes a ring-shaped fender disposed in the upper surface of the first portion, the ring-shaped fender configured to be coupled to the base plate when assembled in order to restrict movement of the first image sensor module in a direction orthogonal to the first optical axis.

17. The camera assembly of claim 10, wherein a width of the first portion is greater than a width of the second portion.

* * * * *